United States Patent
Yamamoto et al.

(10) Patent No.: US 8,123,445 B2
(45) Date of Patent: Feb. 28, 2012

(54) CUTTING METHOD AND MANUFACTURING METHOD OF SHEET MEMBER, SHEET MEMBER, OPTICAL ELEMENT, AND IMAGE DISPLAY DEVICE

(75) Inventors: Satoru Yamamoto, Ibaraki (JP); Hiroaki Mizushima, Ibaraki (JP)

(73) Assignee: Nitto Denko Corporation, Ibaraki-shi (JP)

( * ) Notice: Subject to any disclaimer, the term of this patent is extended or adjusted under 35 U.S.C. 154(b) by 1363 days.

(21) Appl. No.: 11/651,581

(22) Filed: Jan. 10, 2007

(65) Prior Publication Data

US 2008/0289464 A1  Nov. 27, 2008

(30) Foreign Application Priority Data

Jan. 27, 2006  (JP) .................................. 2006-019422
Oct. 17, 2006  (JP) .................................. 2006-282705

(51) Int. Cl.
 *B23C 3/13* (2006.01)
(52) U.S. Cl. ........... 409/293; 409/132; 409/138; 29/558
(58) Field of Classification Search .................. 409/132, 409/138–140, 157, 159, 293, 297, 298, 300, 409/303; 29/557, 558
See application file for complete search history.

(56) References Cited

U.S. PATENT DOCUMENTS

| | | | | |
|---|---|---|---|---|
| 1,933,640 A | * | 11/1933 | Schafer | 451/132 |
| 3,155,008 A | * | 11/1964 | Sporck | 409/293 |
| 3,733,962 A | * | 5/1973 | Persson | 409/297 |
| 4,604,011 A | * | 8/1986 | Rungger et al. | 409/138 |
| 4,648,762 A | * | 3/1987 | Hall et al. | 409/138 |
| 4,985,982 A | * | 1/1991 | Lohr et al. | 29/566.1 |
| 5,096,346 A | * | 3/1992 | Ueda | 409/203 |
| 5,678,964 A | * | 10/1997 | Dashevsky | 409/132 |
| 6,116,829 A | * | 9/2000 | Gnann et al. | 409/132 |
| 2005/0158136 A1 | | 7/2005 | Higashio et al. | |

FOREIGN PATENT DOCUMENTS

| | | |
|---|---|---|
| CN | 1640597 A | 7/2005 |
| JP | 2001-334404 A | 12/2001 |
| JP | 2003-220512 A | 8/2003 |
| JP | 2004-001173 A | 1/2004 |
| JP | 2004-082307 A | 3/2004 |
| JP | 2004-148419 A | 5/2004 |

OTHER PUBLICATIONS

Chinese Office Action dated Nov. 6, 2009, issued in corresponding Chinese Patent Application No. 200710001727.1.
Japanese Office Action dated Aug. 9, 2011, issued in corresponding Japanese Patent Application No. 2006-282705.
Chinese Office Action dated Aug. 16, 2011, issued in corresponding Chinese Patent Application No. 2007100017271.
Taiwanese Office Action dated Oct. 4, 2011, issued in corresponding Taiwanese Patent Application No. 095147889.

* cited by examiner

*Primary Examiner* — Boyer D Ashley
*Assistant Examiner* — Sara Addisu
(74) *Attorney, Agent, or Firm* — Westerman, Hattori, Daniels & Adrian, LLP

(57) ABSTRACT

An end face of a sheet member is cut while rotating a cutting member having a rotation axis extending along a vertical direction of the end face of the sheet member and a cutting blade projecting to a side of the end face of the sheet member around the rotation axis. The cutting member is moved relatively to the sheet member along a longitudinal direction of the end face to be cut. The part separated from a virtual line parallel to the sheet face and passing the rotation center in a cutting region formed by the rotating cutting blade is made to contact the end face of the sheet member.

7 Claims, 8 Drawing Sheets

[FIG.1]
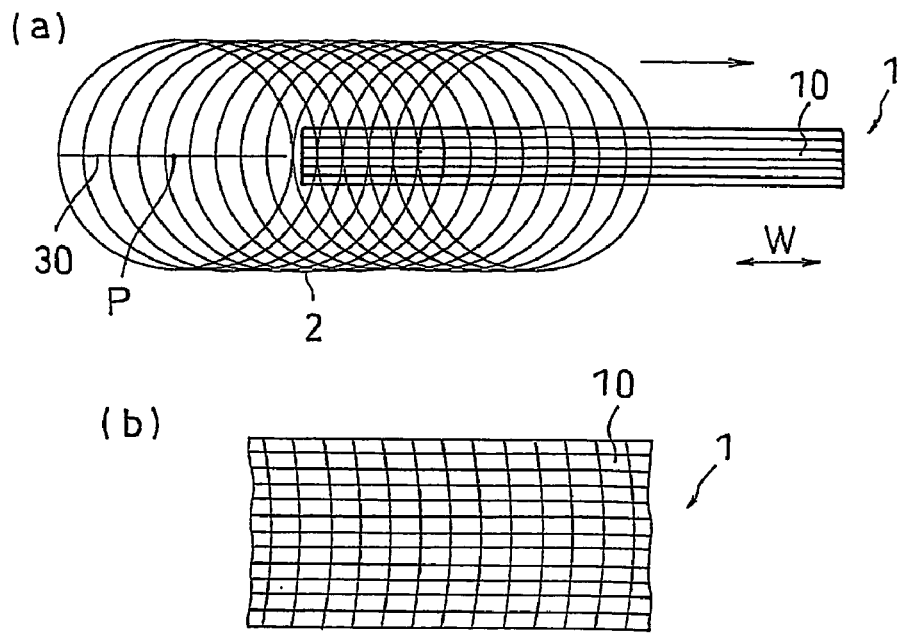
[FIG.2]
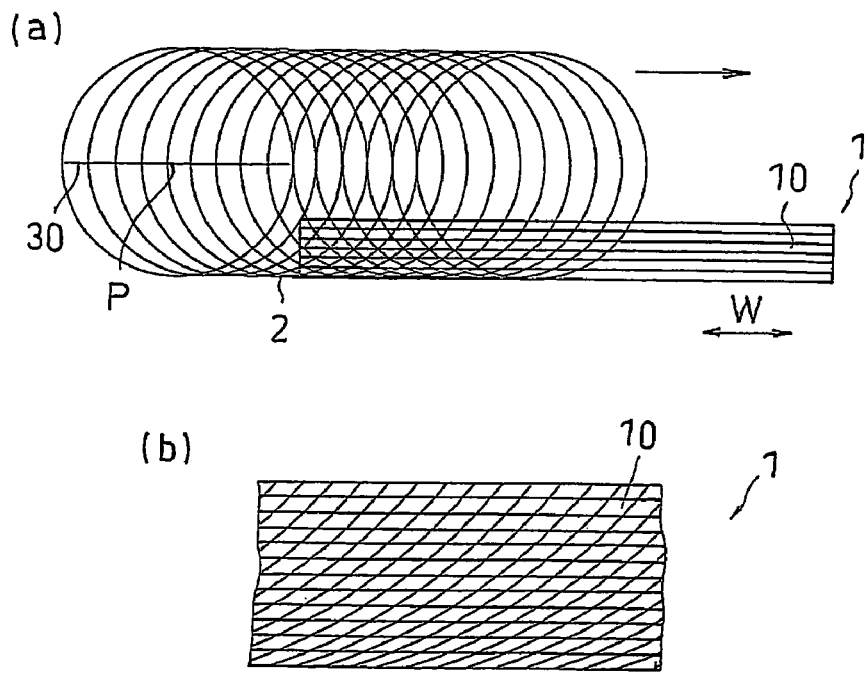

[FIG.3]
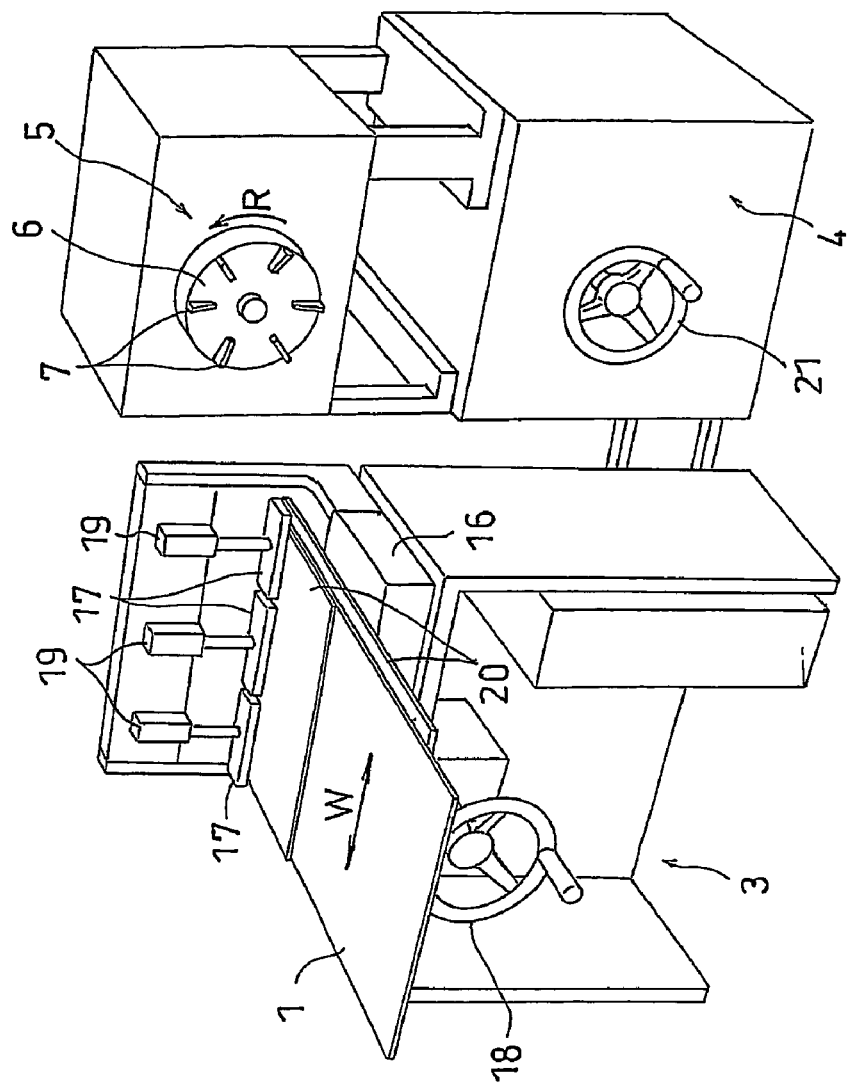

[FIG.4]
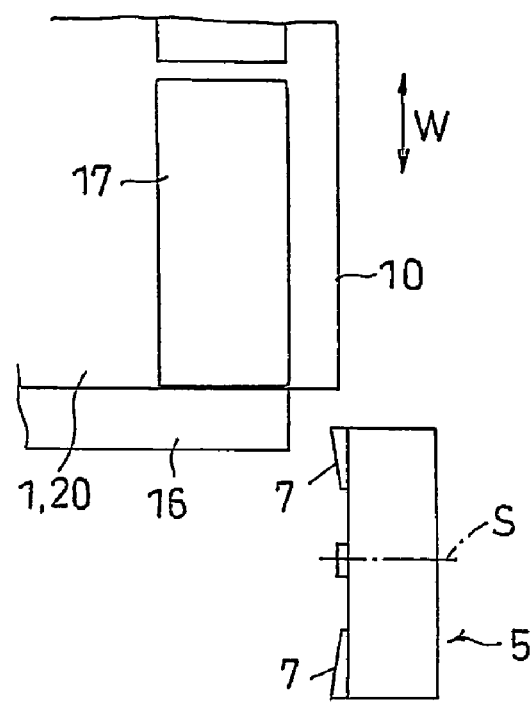
[FIG.5]
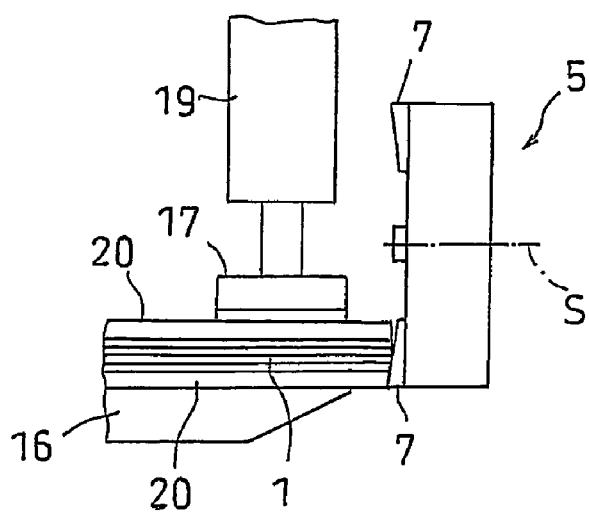

[FIG.6]
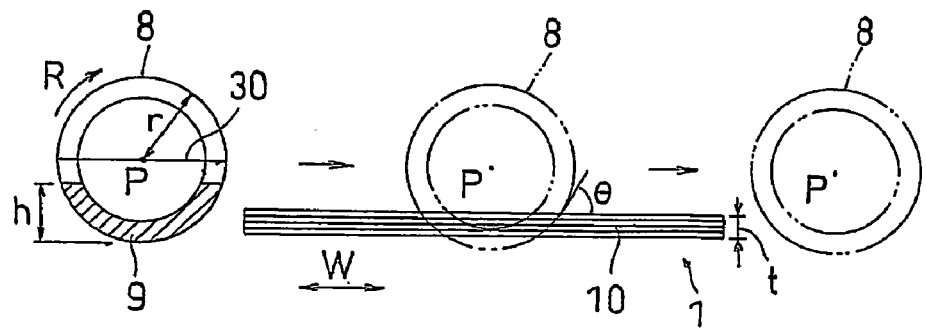
[FIG.7]
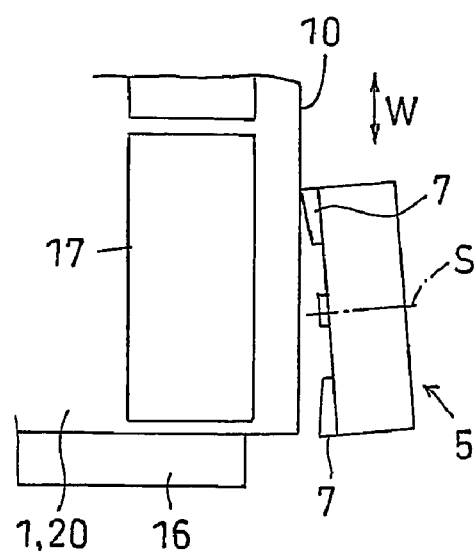

[FIG.8]
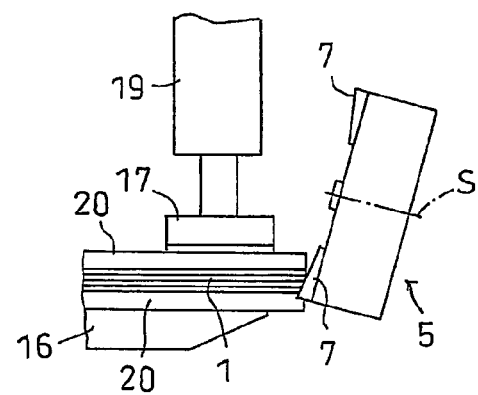
[FIG.9]
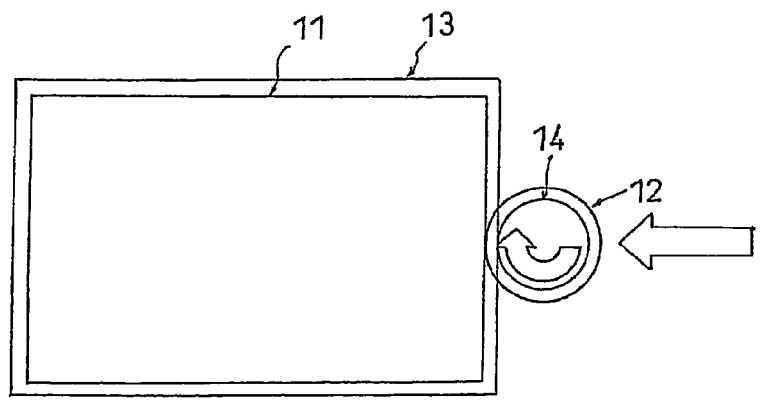
[FIG.10]
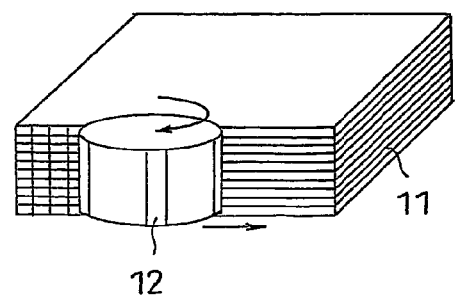

[FIG. 11]
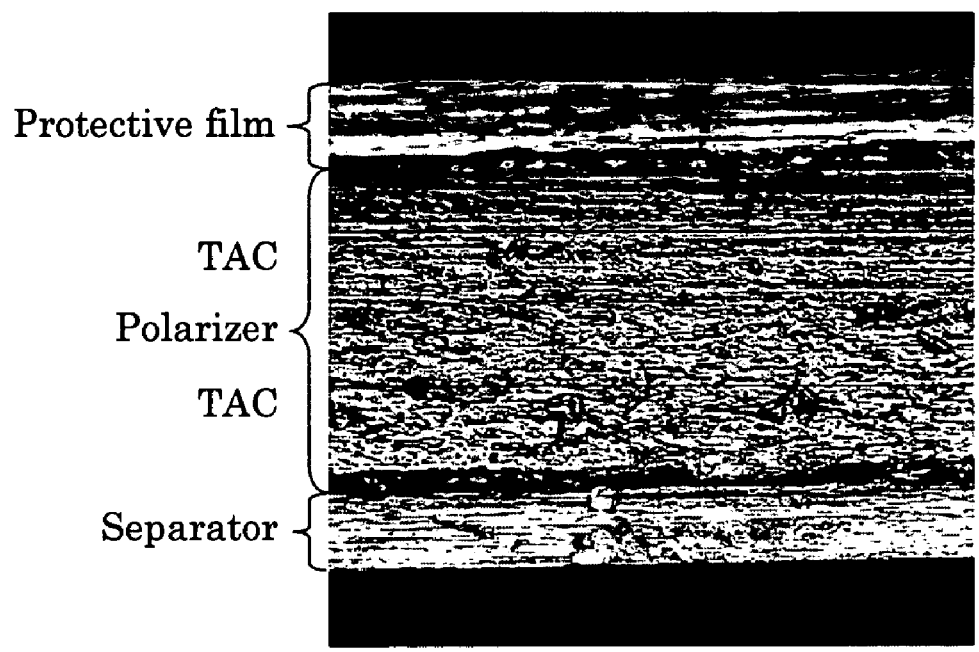
[FIG. 12]
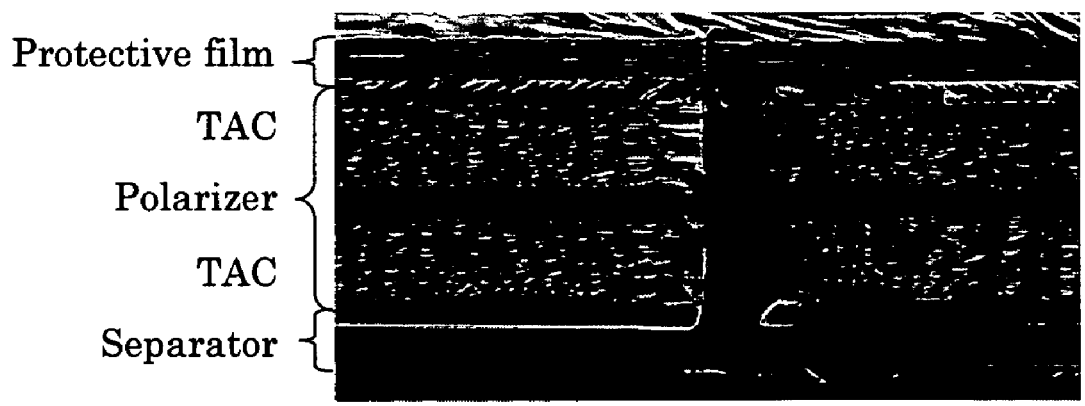

[FIG. 13]
[FIG. 14]
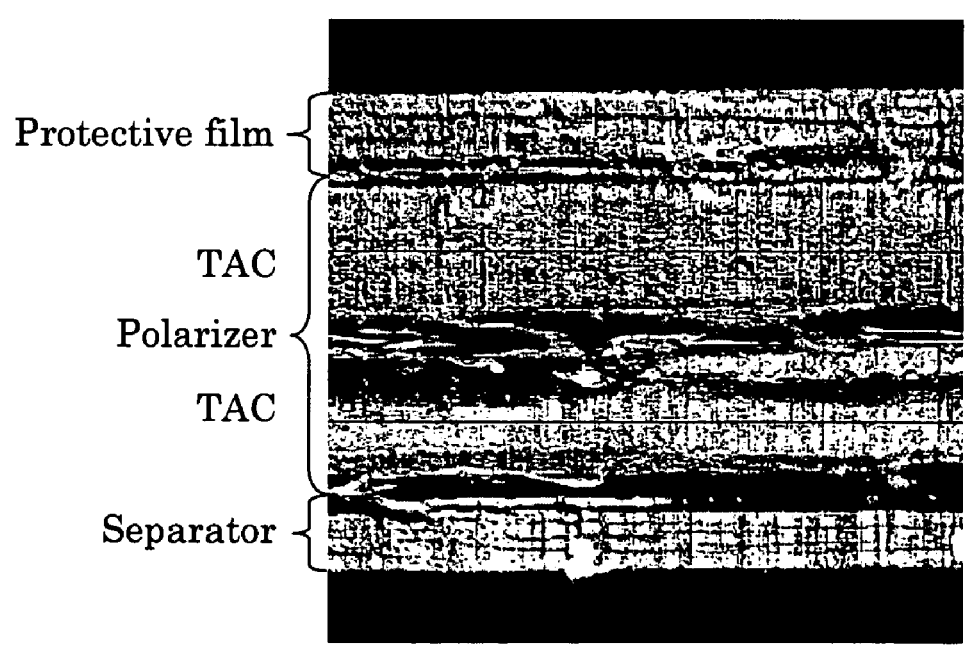

[FIG. 15]
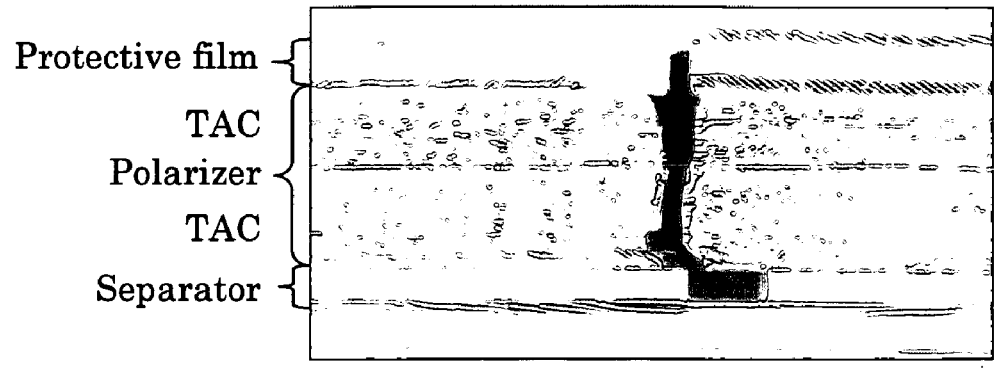
Protective film
TAC
Polarizer
TAC
Separator
[FIG. 16]
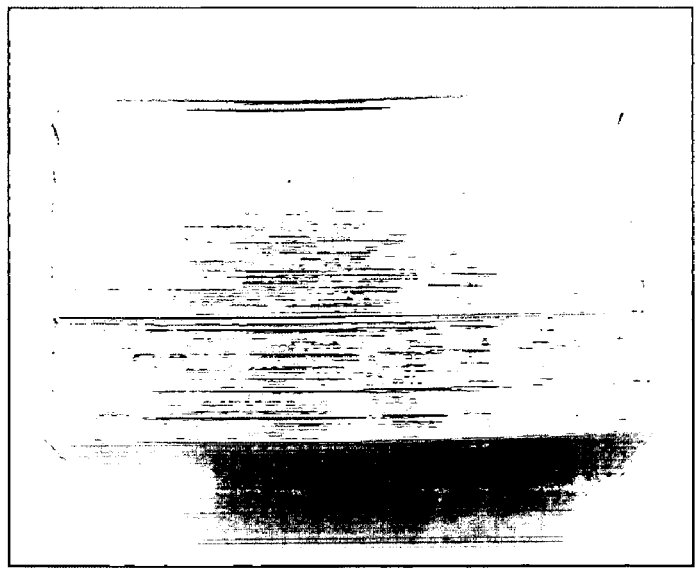

CUTTING METHOD AND MANUFACTURING METHOD OF SHEET MEMBER, SHEET MEMBER, OPTICAL ELEMENT, AND IMAGE DISPLAY DEVICE

BACKGROUND OF THE INVENTION

1. Field of the Invention

The present invention relates to a cutting method for cutting the end face of a sheet member, a manufacturing method of a sheet member having a cutting step with the method, a sheet member with the end face cut with the cutting method, and an optical element and an image display device equipped with the sheet member, and is effective on a sheet member which requires especially high precision end face machining.

2. Description of the Related Art

An example of a sheet member that requires especially high precision end face machining is a film for optical use such as a polarizing plate. The polarizing plate is used in many situations as a constituting member of a liquid crystal display device (may be referred to as LCD below), and in recent years, its demand has been increasing rapidly. Moreover, use of a polarizing plate of high added value with optically compensating functions, brightness improving functions, etc. is increasing, and the demand for display quality tends to increase more. A polarizing plate is generally used in which a protective film such as triacetyl cellulose (may be referred to as TAC below) is laminated on the both faces of a polarizing film consisting of a polyvinyl alcohol based film on which adsorption and orientation of iodine or a dichroic dye is performed. Further, a polarizing plate is also used depending on the objectives when a film having optical compensating functions and brightness improving functions is laminated through an agglutinant or an adhesive.

In order to mount a polarizing plate on a LCD panel, the polarizing plate is required to be machined into a predetermined shape and dimension, and it is very important to finish the end face with high precision and in good condition for the polarizing plate to be mounted on a narrow framed panel. Generally, a raw sheet of a lengthy form of a mono-layered sheet or a multi-layered sheet (for example, one that is formed with an optical film layer and an adhesive layer and is called a laminated film) is cut into a rectangular shape using a blanking blade die, etc. This sheet member is expanded in the uniaxial or biaxial direction, and the cutting is performed without concern for the direction of the extension. However, there is a problem that fiber-shaped broken pieces attaching to the end face of the cut sheet member (a cut surface) and adhesive squeezing-out from the end face by the pressure of the cutting cause deterioration in the appearance and deterioration in quality.

In the cutting method disclosed in Japanese Patent Application Laid-Open No. 2004-148419 described below, a copying roller 14 shown in FIG. 9 is used. This copying roller 14 is always pressed onto a copying mold 13, and by cutting the end face of a sheet member 11 with a rotating blade 12 installed on the core of the roller, fiber-shaped broken pieces attached on the end face can be removed. However, in this method, because the rotating blade 12 projecting in the radial direction contacts with the end face of the sheet member 11 at equal intervals while being pressed as shown in FIG. 10, striped cutting traces are deeply formed on the end face and there is a problem that the appearance deteriorates and a sufficient dimensional accuracy cannot be obtained.

SUMMARY OF THE INVENTION

The above-described situation is considered by the present invention, and the objective is to provide a cutting method in which the end face of a sheet member can be finished with accuracy and in good condition, a manufacturing method of a sheet member having a cutting step with this cutting method, a sheet member obtained with this cutting method, and an optical element and an image display device equipped with the sheet member.

In order to achieve the objectives described above, the cutting method in the present invention is a cutting method for cutting the end face of a sheet member, where while rotating a cutting member having a rotation axis extending along the vertical direction of the end face of the sheet member and a cutting blade projecting to the side of the end face of the sheet member around the rotation axis, the cutting member is moved relatively to the sheet member along the longitudinal direction of the end face to be cut, and the part separated from a virtual line parallel to the sheet face and passing the rotation center in the cutting region formed by the rotating cutting blade is made to contact the end face of the sheet member.

In the cutting method in the present invention, a cutting member having a rotation axis extending along the vertical direction of the end face of the sheet member and a cutting blade projecting to the side of the end face of the sheet member is used. When the end face of the sheet member is cut, while rotating the cutting member around the rotation axis, the cutting member is moved along the longitudinal direction of the end face to be cut, and the rotating cutting blade is made to enter the end face of the sheet member. Furthermore, because the cutting member is moved relative to the sheet member, it is not limited to the process that the cutting member is moved close to the sheet member; the sheet member may be moved close to the cutting member, or both members may be moved close to each other. In the case that fiber-shaped broken pieces are attached to the end face or an agglutinant is squeezed-out, these are removed by making the rotating cutting blade enter the end face of the sheet member. Because such a cutting blade passes without being pressed to the end face like the rotating blade 12 shown in FIGS. 9 and 10, the cutting traces become relatively shallow and the surface can be finished in good condition.

In the present invention, when cutting is performed by making a cutting region formed by a rotating cutting blade contact the end face of the sheet member, the part separated from a predetermined virtual nine in the cutting region is made to contact the end face of the sheet member. Such a virtual line is a virtual nine stretching parallel to the sheet face of the sheet member and passing the rotation center of the cutting region. The operational effect based on the configuration is explained by referring to FIGS. 1 and 2.

FIG. 1 is a conception figure of a cutting method exemplified for comparison to the present invention and shows that the region in the vicinity of a virtual line 30 passing the rotation center P of the cutting region and parallel to the sheet face is made to contact an end face 10 of a sheet member 1 in the condition that a plurality of the members are layered. On the other hand, FIG. 2 is a conception figure showing an example of the cutting method in the invention and shows that the part separated from virtual line 30 of the cutting region is made to contact the end face 10 of the sheet member 1. The (b) in both figures shows cutting traces formed on the end face 10. Furthermore, numeral reference 2 is the trace of the rotating cutting blade. Although the trace of the actual cutting blade is a spiral, the trace is described conceptually by shifting a circular trace with a predetermined pitch for convenience of the figure.

In FIG. 1, the angle that the cutting blade enters the end face no of the sheet member 1 is about 90° to the longitudinal direction W of the end face 10, or in other words, the direction of cutting is approximately parallel to the direction of the thickness of the end face 10 (up and down direction in FIG. 1). On the other hand, in FIG. 2, the cutting direction is largely tilted in the direction of the thickness of the end face 10 and the cutting pitch is smaller than that of FIG. 1. By making the part separated from the virtual line 30 on cutting region 8 contact the end face, the pitch of the cutting traces formed on the end face becomes small and less conspicuous, and the appearance becomes good.

Further, the operational effect as follows is achieved depending on the difference in the cutting direction in the above description. That is, according to the method shown in FIG. 1, the rotating cutting blade operates on the end face 10 of the sheet member 1 in the direction of being pressed straight down (or pressed straight up) and there is a tendency that cracks and gaps on the end face easily occur. However, in the method shown in FIG. 2, the pressing-down (or pressing-up) operation by the cutting blade is relieved, and the occurrence of cracks and gaps on the end face can be prevented. As a result, the end face of the sheet member can be finished in good condition, and superior dimensional accuracy can be effectively obtained by suppressing the occurrence of irregularity on the end face.

The inventors of the present invention zealously studied such cutting and found that the above-described operational effect can be obtained effectively when the entering angle of the cutting blade to the end face becomes 75° or less to the longitudinal direction of the end face. That is, in the present invention, the angle at which the above-described cutting blade enters is preferably 75° or less to the longitudinal direction of the end face when the part of the above-described cutting region contacts with the end face of the above-described sheet member. The entering angle of the cutting blade can be defined as the angle between a tangent at a position where the cutting blade enters the end face of the sheet member and the longitudinal direction of the end face. When the entering angle exceeds 75°, the method becomes closer to the method shown in FIG. 1, the cutting trace becomes more conspicuous, and the effect of preventing cracks and gaps on the end face tends to become small.

Further, in the present invention, the part of the above-described cutting region contacting with the end face of the above-described sheet member is preferably separated by ⅓ of the radius or more of a circular shape or a ring shape of the above-described cutting region from the above-described virtual line. In the region separated by ⅓ of the radius or more of the cutting region from the virtual line among the regions separated from the virtual line passing the rotation center of the cutting region, because the entering angle of the above-described cutting blade certainly becomes 75° or less, the above-described operational effect in the present invention can be preferably obtained. That is, in the region separated by less than ⅓ of the radius from the virtual line passing the rotation center of the cutting region, the method becomes closer to the method shown in FIG. 1, the cutting trace becomes more conspicuous, and the effect of preventing cracks and gaps on the end face tends to become small.

In the present invention, it is preferable that a plurality of the sheet members is set in the layered state and the end faces of the layered sheets are cut together. Consequently, the end faces of a plurality of the sheet members can be cut together and the machining efficiency can be improved. Furthermore, by setting a plurality of the sheet members in the layered state, because the sheet member is pressed-down (or pressed-up), it becomes difficult to escape in the direction of the thickness, and there is a tendency that cracks and gaps on the end face easily occur. However, in the present invention, because a pressing-down (or pressing-up) operation by the cutting blade is relieved, such faults can be prevented effectively.

In the above description, it is preferable that the rotation axis of the above-described cutting member is tilted in the longitudinal direction of the end face of the above-described sheet member, and the above-described rotating cutting blade enters the end face of the above-described sheet member from only one direction. Consequently, contact by the return rotation of the cutting blade to the end face of the sheet member is prevented, and the cutting traces are formed in a fixed direction on the end face. As a result, the cutting trace formed on the end face of the sheet member becomes less conspicuous and good appearance quality is obtained.

In the above description, the end face of the above-described sheet member can be cut in the state in which the rotation axis of the above-described cutting member is tilted in the direction of the thickness of the end face of the above-described sheet member. Consequently, the cutting can be performed by tilting the end face of the sheet member to the direction of the thickness and can accommodate many varieties. Such cutting can be performed effectively based on the configuration of the present invention where the part separated from the above-described virtual line in the cutting region is made to contact the end face.

The cutting method in the present invention becomes very effective in cutting the end face when the sheet member are made by laminating a plurality of optical films. A specific example of such a sheet member is a polarizing plate.

Further, in the cutting method of the present invention, in the respect that the end face of the sheet member is finished in good condition with high accuracy, the rotation speed of the cutting member is preferably 2000 to 7000 rpm, and the relative movement velocity of the cutting member is preferably 0.5 to 4.0 m/min.

The manufacturing method of a sheet member in the present invention has a step to cut the end face of the sheet member with the above-described methods, and a sheet member finished with high accuracy in good condition by the above-described operational effect can be manufactured.

The sheet member in the present invention is a sheet member where the end face is cut with the above-described methods. In such a sheet member, it is preferable that a cutting trace extending at the angle of 75° or less to the longitudinal direction of the end face is formed on the end face. The angle of the cutting trace can be defined as an angle between a tangent of the cutting trace and the longitudinal direction of the end face. Further, the maximum height of the cut end face is preferably 6 μm or less. This maximum height is a maximum value of the difference in level due to unevenness of micro uneven shapes formed on the end face and corresponds to the maximum height Rz of a profile curve defined in JISB0601: 2001.

The optical element in the present invention is an optical element provided with the sheet member on one side or on both sides of it. Then, the image display device in the present invention is an image display device mounted with the sheet member or the optical element.

BRIEF DESCRIPTION OF THE DRAWINGS

FIG. 1 is a concept diagram explaining a method for cutting exemplified for comparison with the present invention.

FIG. 2 is a concept diagram explaining a method for cutting in the present invention.

FIG. 3 is a schematic perspective view showing one example of a device configuration to be used in a method for cutting in the present invention.

FIG. 4 is a top view showing the end face of the sheet member.

FIG. 5 is a side view showing the end face of the sheet member.

FIG. 6 is a concept diagram explaining a method for cutting in the present invention.

FIG. 7 is a top view showing the end face of the sheet member to be cut with a method in another embodiment of the present invention.

FIG. 8 is a side view showing the end face of the sheet member to be cut with a method in another embodiment of the present invention.

FIG. 9 is a top view explaining the conventional method for cutting.

FIG. 10 is a perspective view explaining the conventional method for cutting.

FIG. 11 is a microscope photo of a front view of the end face after the cutting in the present invention.

FIG. 12 is a microscope photo of a side view of the end faces after the cutting is placed face to face in the present invention.

FIG. 13 is a photo showing a laminated body of a polarizing plate cut in the present invention.

FIG. 14 is a microscope photo of a front view of the end face after the cutting in the conventional method.

FIG. 15 is a microscope photo of a side view of the end faces after the cutting is placed face to face in the conventional method.

FIG. 16 is a photo showing a laminated body of a polarizing plate cut in the conventional method.

DETAILED DESCRIPTION OF THE INVENTION

<Device to Cut the End Face of Sheet Member and Method>

The preferred embodiments in the present invention are explained using figures. FIG. 3 is a schematic perspective view showing a configuration of an end face-cutting device used for cutting the end face of the sheet member. The top view showing the end face of the sheet member set in the device is shown in FIG. 4, and the side view is shown in FIG. 5.

The end face cutting device shown in FIG. 3 is equipped with a workpiece fixing device 3 and a workpiece machining device 4, and they are mounted parallel to each other with a different depth. The workpiece fixing device 3 has a worktable 16 and a pressing member 17 arranged on the upper side of the worktable 16. The sheet member 1 to be an objective of the cutting is loaded on the worktable 16, and the height of the table is configured to be adjustable by operating a lift handle 18. The pressing member 17 is mounted at the tip of a rod of an air cylinder 19 and is configured to be displaceable between a position near the worktable 16 and a position separated. In the present embodiments, a plurality of pressing members 17 is arranged along the longitudinal direction W of the sheet member 1.

In the present embodiment, a plurality of sheet members 1 is used by layering in the direction of the thickness in order to cut together the end faces of a plurality of the sheet members 1. The sheet member 1, described specifically later, can be obtained for example by cutting a raw sheet of a lengthy form of a mono-layered sheet or a multi-layered sheet into a rectangular shape. The sheet member 1 loaded on the worktable 16 is held and fixed such that the upper sheet face is pressed by the pressing member 17. In the present embodiments, acrylic plates 20 are placed on the top and the bottom of the layered sheet members 1 to prevent damage by the pressing. The end face 10 of the sheet member 1 to be cut overflows to the depth (the right side in the figures) of the worktable 16 as shown in FIGS. 4 and 5, and the amount of the overflow is set to the margin to cut or more.

A work-machining device 4 is equipped with a cutting member 5 that cuts the end face 10 of the sheet member 1, and the depth (the orientation of the left and right direction in FIGS. 4 and 5) of the cutting member 5 is configured to be adjustable appropriately by operating a depth-adjusting handle 21. Further, the cutting member 5 is configured to be movable to the longitudinal direction W of the end face 10 of the sheet member 1 by a moving mechanism not shown in the figures. The cutting member 5 in the present embodiments is provided with a plurality of cutting blades 7 in the plane face part of a disc-shaped main body 6 and is configured to be abler to rotate around the rotation axis S by a driving device not shown in the figures. The rotation axis S extends along the vertical direction of the end face 10 of the sheet member 1 and parallel to the vertical direction in the present embodiments.

Each cutting blade 7 is mounted projecting to the side of the end face 10 of the sheet member 1, and the position is adjusted so that the tip of the blade overlaps with the end face 10 in the view from the longitudinal direction as shown in FIG. 5. In the present embodiments, each of the six cutting blades 7 is arranged with a predetermined interval. Furthermore, the number of the cutting blades is not especially limited and can be determined properly depending on various conditions such as the distance from the rotation axis S to the cutting blade. However, a larger number is preferable as the distance from the rotation axis S is farther. At this time, the arrangement of the cutting blade is not especially limited. However, it is preferable in the respect such as machining efficiency that a plurality of the cutting blades is mounted at an equal distance from the rotation axis S and at a predetermined interval.

The shape of the cutting blade 7 is not especially limited and may be a column, a square pillar, a pillar in which the cross-section is a trapezoid, hemisphere, etc. The shape and size of the cutting blade 7 can be set properly depending on the dimension of the sheet member and the desired process efficiency, etc. Further, the cutting blade 7 may be tilted based on the axial direction of the rotation axis S as long as it is projecting to the side of the end face 10 to be cut. Examples of the materials of the cutting blade 7 include metal and diamond. However, it is not limited to these as long as it is a material suitable to cut the sheet member 1.

Next, a method for cutting the end face of the sheet member is explained. First, a plurality of the sheet members 1 is set in the layered state. At this time, in order to prevent damage from pressing by the pressing member 17 and by the impact at cutting, the thickness of the layered sheet members 1 is made to be at least 1 mm or more, preferably 1.5 mm or more, and more preferably 2 mm or more. Next, as shown in FIGS. 3 to 5, the sheet member 1 in which a plurality of sheet members are layered is loaded in the workable 16, and held and fixed through the acrylic plate 20. Them, after the positions of the sheet member 1 and the cutting member 5 are confirmed and adjusted, the cutting member 5 is moved along the longitudinal direction W of the end face 10 whine being rotated in the R direction.

FIG. 6 is a figure showing the relationship of the positions of the cutting region and the end face of the sheet member and corresponds to the case when FIG. 5 is seen from the right side. In the present embodiments, the cutting region 8 having ring shape is formed by the rotating cutting blade 7. Furthermore, in the case that the cutting blade extends in the radial direction from the rotation center P, a cutting region having a circular shape is formed. The cutting of the end face 10 of the sheet member 1 is performed using a region 9 which is a par separated from the virtual line 30 parallel to the sheet face and passing the rotation center P in the cutting region 8. That is, the cutting member 5 is moved along the longitudinal direction W while being rotated and the cutting is performed by making the region 9 contact the end face 10.

According to such cutting, because the entering angle θ of the cutting blade 7 to the end face 10 is off from 90°, and the direction of cutting is tilted based on the direction of the thickness of the end face 10 as shown FIG. 2, the pitch of the cutting trace becomes small and less conspicuous, the appearance becomes good, and the occurrence of cracks and gap on the end face can be prevented. In order to perform such cutting, the table height of the worktable 16 is adjusted in advance so that the above-described relationship of the positions of the sheet member 1 and the cutting region 8 can be obtained. Furthermore, in the present embodiment, an example using the region 9 of the part separated under the virtual line 30 of the cutting region 8 is shown. However, the region of the part separated above the virtual line 30 instead of this may be used.

The entering angle θ of the cutting blade 7 to the end face 10 is preferably 75° or ness, and because of this, the effect of the present invention such that the cutting trace becomes less conspicuous and the occurrence of cracks and gaps on the end face is prevented can be obtained effectively. Further, the entering angle θ is preferably 23° or more and when it is less than 23°, the effect of suppressing the irregularity of the end face becomes small and the dimensional accuracy tends to decrease.

The region 9 is preferably separated by ⅓ or more of radius r of the cutting region 8 from the virtual line 30, and consequently, because the entering angle θ of the cutting blade 7 certainly becomes 75° or less, the above-described operational effect can be obtained effectively. Furthermore, the region 9 is more preferably separated ½ or more of the radius r from the virtual line 30 and further preferably separated ⅚ or more of the radius r. Further, when a part separated by more than ¹⁰⁄₁₁ of the radius r from the virtual line 30 in the region 9 is made to contact the end face 10, because the effect of suppressing the irregularity of the end face becomes small and the dimension accuracy tends to decrease, it is preferable to use a part within ¹⁰⁄₁₁ of the radius r from the virtual line 30.

In the cutting region 8, the entering angle θ of the cutting blade 7 becomes smaller as the region is separated more from the virtual line 30, and the condition of the end face becomes good. However, as the thickness of the layered sheet members 1 becomes thicker, the sheet member which is laying on the top becomes closer to the virtual line 30 and the entering angle θ of the cutting blade 7 becomes larger. Accordingly, by setting the thickness t of the layered sheet members 1 (not including the thickness of the acrylic plate) to satisfy t≦2r/3 and passing a part in the region separated by r/3 from the virtual line 30 of the cutting region 8, the entire region of the end face can be finished in good condition.

In the present embodiments, because the cutting member 5 is rotated in the R direction, when the end face 10 of the sheet member 1 starts to contact the region 9, the cutting blade 7 can enter the end face 10 without resisting the pressure of the sheet member 1 from the pressing member 17. As a result, the pressure of the sheet member 1 can be kept appropriate, and the accuracy of the cutting can be ensured. Furthermore, the present invention is not limited to this, and the cutting member 5 may be rotated in the opposite direction to the R direction. In such a case, because the cutting blade 7 enters the end face 10 from the direction facing the feed direction of the sheet member (the direction going from right to left in FIG. 6), movement with a constant speed is ensured, and the end face 10 can be finished in good condition without the sheet member 1 fed with acceleration. The rotation direction of the cutting member 5 can be set properly considering the above-described situation.

As far as process conditions, the rotation speed of the cutting member 5 is preferably 2000 to 7000 rpm and the relative movement velocity is preferably 0.5 to 4.0 m/min, and more preferably, the rotation speed is 4000 to 6000 rpm and the movement velocity is 2.0 to 3.0 m/min. In the case that the rotation speed is less than 2000 rpm and the movement velocity exceeds 4.0 r/min, the load of the cutting blade 7 increases and the end face tends to be rough, and for example, in the case that the polarizing plate cut with this method is mounted in the panel of a LCD, faults in display may occur. On the other hand, when the rotation speed exceeds 7000 rpm, the end face may be damaged due to frictional heat. Further, if the movement velocity is less than 0.5 m/min, productivity tends to decrease.

<Specific Examples of Sheet Member>

The sheet member in the present invention is a sheet member in which the end face is cut with the cutting method in the present invention, and preferably a sheet member in which a cutting trace extending at an angle of 75° or less to the longitudinal direction of the end face is formed. Inn such a case, the cutting trace becomes less conspicuous and the appearance is good as described above, the occurrence of cracks and gaps on the end face can be preferably prevented by the fact that entering angle θ to the end face 10 of the cutting blade 7 is 75° or less, and sufficient dimensional accuracy is ensured. Furthermore, in the respect of ensuring the dimensional accuracy, the entering angle θ is preferably 23° or more.

The maximum height of the cut end face of the sheet member in the present invention is preferably 6 μm or less. In such a case, a light leak, etc. from the space that occurs due to the irregularity of the cutting trace can be prevented as well as in the case that a large-sized sheet member is formed in placing an end face against the other. Furthermore, the maximum height of the end face is more preferably 5 μm or less, further preferably 4 μm or less, and more preferably as it becomes smaller.

A mono-layered body or a multi-layered body of various sheet materials can be used as a sheet member without specific limitation. However, the application to a sheet member in which a plurality of optical films are laminated to the cutting method in the present invention is useful, and an example of such a sheet member is a polarizing plate in which a transparent protective layer is laminated through an agglutinant or an adhesive on one face or on both faces of a polarizing film.

As for the above described polarizing films, a variety of films that have been prepared by coloring through the absorption of iodine or a dichromatic substance, by cross-linking, by expanding and by drying according to a conventional method can be utilized without particular limitations. As for the variety of films into which a dichromatic substance is absorbed, as described above, for example, hydrophilic polymer films such as polyvinyl alcohol (hereinafter may be referred to by the abbreviation PVA) based films, partially formal polyvinyl alcohol based films, ethylene and vinyl acetate copolymer based partially saponified films, and cellulose based films can be cited, and in addition to these, for example, polyene orientation films such as products resulting from the dehydration processing of polyvinyl alcohol, and products resulting from the dehydrochlorination processing of polyvinyl chloride can also be utilized. From among these, PVA based films are preferable. The thickness of the above described polarizing films is generally in a range from 5 μm to 80 μm, but is not limited to this range.

A polarizing film of a polyvinyl alcohol based film which is colored with iodine and expanded in uniaxial direction can be fabricated, for example, by submerging polyvinyl alcohol in a solvent of iodine so that the film thereof is colored, and by expanding the film to three to seven times its original length. If necessary, the film can be submerged in a solvent of boric acid or potassium iodide. Furthermore, if necessary, the polyvinyl alcohol based film may be submerged in water so as to be washed before coloring. Stains or a blocking preventing agent on the surface of the polyvinyl alcohol based film can be cleaned by washing the polyvinyl alcohol based film with water, and in addition, the polyvinyl alcohol based film can be swollen so as to gain the effect of prevention of unevenness of coloring. The expansion may be carried out after the coloring with iodine, or may be expanded while coloring, or may be colored with iodine after the expansion. Expansion can be carried out in a solvent of boric acid or potassium iodide, or in water.

Though the above described transparent protective layer is not particularly limited, but rather, a conventional transparent protective film can be utilized, a film having excellent properties, such as high transparency, physical strength, thermal stability, moisture blocking properties, isometrics and the like, is preferable. As concrete examples of the materials for such a transparent protective layer, cellulose based resins such as diacetyl cellulose and triacetyl cellulose, polyester based resins such as polyethylene terephthalate and polyethylene naphthalate, acryl based resins such as polymethyl methacrylate, polystyrene based resins such as polystyrene and acryl nitrile styrene copolymer (AS resin), polycarbonate based resins, polyethylene, polypropylene, cyclic polymer or norbornene based resins, polyolefin based resins such as ethylene propylene copolymers, vinyl chloride based resins, vinylidene chloride based resins, polyamide based resins such as nylon and aromatic polyamide, polyimide based resins, polyether sulfone based resins, polysulfone based resins, polyether ether ketone based resins, polyphenylene sulfide based resins, vinyl alcohol based resins, vinyl butyral based resins, arilate based resins, polyoxymethylene based resins, epoxy based resins, acetate based resins, and transparent resins which are mixtures of the above described polymers and the like can be cited. In addition, thermosetting resins and ultraviolet curing resins such as the above described acryl based resins, urethane based resins, acryl urethane based resins, epoxy based resins and silicone based resins can be cited.

In addition, the above described transparent protective layer may further have an optical compensation function as a transparent protective layer having an optical compensation function in this manner, for example, conventional transparent films wherein coloring that may cause a change in the visible angle based on the retardation between liquid crystal cells is prevented, and of which the purpose is to expand the viewable angle for high visibility can be utilized. Concretely speaking, for example, a variety of expanded films gained by expanding the above described transparent resins in uniaxial direction or in biaxial direction, orientation films such as liquid crystal polymers, and layered bodies where orientation layers of liquid crystal polymers or the like are placed on transparent bases, can be cited. Among these, the above described orientation films of liquid crystal polymers are preferable, from the point of view of achieving a wide visible angle for high visibility, and in particular, a retardation film wherein an optical compensating layer that is formed of an inclined orientation layer of a discotic based or nematic based liquid crystal polymer is supported by the above described triacetyl cellulose film or the like. Commercially available products, such as "WV films" made by Fuji Photo Film Corporation, for example, can be cited as the above described optical compensating retardation films. Here, two or more layers of the above described retardation films or film supports may be layered, and thereby, optical properties, such as retardation, can be controlled in each of the above described optical compensating retardation films.

The thickness of the above described transparent protective layer is not particularly limited, but rather, can be appropriately determined in accordance with the retardation, protective strength and the like, and generally, can be 5 mm or less, preferably 1 mm or less, and more preferably in the range from 1 μm to 500 μm. The above described transparent protective layer can be appropriately formed according to a conventional method, such as, for example, a method for applying any of the above described variety of transparent resins to a polarizing film, or a method for layering a film made of any of the above described transparent resins or any of the above described optical compensating retardation films to the above described polarizing film, and commercially available products can also be utilized.

Here, in the case where any of the above described transparent protective layers are provided on the two sides of a polarizing film, transparent protective layers made of the same material may be used for the front and the rear side, or transparent protective layers made of different materials may be used.

Furthermore, hard coating processing, processing for reflection prevention, processing for the purpose of diffusion or anti-glare and the like, for example, may be additionally carried out on any of the above described transparent protective layers. A purpose of the above described hard coat processing is to prevent scratching on the surface of the polarizing plate, and is for forming a hard coating film having a high degree of hardness and smoothness of a curing resin on the surface of any of the above described transparent protective layers. As the above described curing resin, ultraviolet curing resins such as, for example, silicone based resins, urethane based resins, acryl based resins and epoxy based resins can be utilized, and the above described processing can be carried out according to a conventional method. A purpose of the above described processing for reflection prevention is to prevent reflection of external night from the surface of the polarizing plate, and can be carried out by forming a reflection preventing film or the like according to the prior art.

A purpose of the above described processing for anti-glaring is to prevent hampering of the visibility of light that has passed through the polarizing plate caused by the reflection of external light from the surface of the polarizing plate, and this processing can be carried out, for example, by forming microscopic irregular structures on the surface of any of the above described transparent protective layers according to a conventional method. As for such a method for forming an irregular structure, a method for roughening of a surface in accordance with a sandblast method or emboss processing, and a method for forming a transparent protective layer as described above by mixing transparent microscopic particles into a transparent resin as described above, can be cited.

As for the above described transparent microscopic particles, particles of silica, alumina, titania, zilconia, tin oxide, indium oxide, cadmium oxide and antimony oxide, for example, can be cited, and in addition to these, inorganic microscopic particles having conductivity, and organic particles formed of cross-linked or non cross-linked polymer particles can also be utilized. Though the average diameter of the above described transparent microscopic particles is not particularly limited, it is preferable for it to be, for example, in the range from 0.5 µm to 50 µm. In addition, though the ratio of the mixture of the above described transparent microscopic particles is not particularly limited, it is preferable for it to be in the range from 2 weight parts to 70 weight parts per 100 weight parts of the above described transparent resin, and more preferably in the range from 5 weight parts to 50 weight parts.

An anti-glare layer into which transparent microscopic particles have been mixed as described above can be utilized as a transparent protective layer in itself, and in addition, may be formed as a layer that has been applied to the surface of the transparent protective layer. Furthermore, the above described anti-glare layer may also serve as a diffusion layer for diffusing light passing through the polarizing plate, in order to expand the visible angle.

Here, the above described reflection preventing film, diffusion layer, anti-glare layer and the like, for example, can be provided to the polarizing plate separately from the above described transparent protective layer, as in an optical layer formed of a sheet or the like to which these layers have been provided.

Transparent protective layers that have been formed as described above may be layered on only one or both sides of the above described polarizing film, and in the case where transparent protective layers are layered on both sides, transparent protective layers of the same type may be utilized, or transparent protective layers of different types may be utilized.

A method for making the above described polarizing film adhere to the above described transparent protective layer, in particular, the optical compensating retardation film, is not particularly limited, but rather, adhesion can be carried out according to a conventional method. En general, an adhesive or an adhesive material is utilized, of which the type can be appropriately determined in accordance with the type of the polarizing film and transparent protective layer. Concretely speaking, in the case where the above described polarizing film is a polyvinyl alcohol based film, a water soluble adhesive is preferable, from the point of view of, for example, stability of the adhesion processing. As for the water soluble adhesive, polyvinyl alcohol based adhesives, gelatin based adhesives, vinyl based latexes, water soluble polyurethane and water soluble polyester can be cited as examples. The above described water soluble adhesives are generally used as adhesives made of solutions.

The gel strength of some of the above described adhesives is increased by making them contain a cross-linking agent, thereby increasing adhesiveness. Polyvinyl alcohol based adhesives can be made to contain a water soluble cross linking agent such as boric acid, borax, glutaraldehyde, melamine and oxalic acid. Though the amount of added water soluble cross-linking agent is not particularly limited, the amount is generally set at a value not greater than 40 weight parts relative to 100 weight parts of the solid of polyvinyl alcohol, which is the main component, and is preferably in a range from 0.5 weight parts to 30 weight parts. In addition, pH of the above described adhesives can be changed in order to make cross-linking progress. Furthermore, an additive such as formic acid, phenol, salicylic acid or benzaldehyde can be mixed with the above described adhesives as an antiseptic agent at the time of preparation of the solution, if necessary.

These adhesives may be directly applied to the surface of the polarizing film or the transparent protective layer, or an adhesive layer may be formed of the above described adhesives in such a form as a tape or a sheet, which may be placed on the above described surface.

Adhesion of a polarizing film to a transparent protective layer can be carried out by means of a roll laminator. Though the thickness of the adhesive layer is not particularly limited, it is generally approximately 0.05 µm to 5 µm.

In addition, it is preferable for the polarizing plate to additionally have an adhesive material layer, for example, in order to make lamination on liquid crystal cells and the like easy, as described above, and such adhesive material layers can be placed on one or two sides of the above described polarizing plate. The formation of the above described adhesive material layers on the surfaces of the above described polarizing plates can be carried out, for example, according to a method wherein a solution or melted liquid of an adhesive material is directly applied to predetermined surfaces of the above described polarizing plate so as to form a layer in accordance with a spreading technique, such as flowing or applying, or according to a method wherein an adhesive material layer that has been formed in the above described manner on the below described separator is shifted to predetermined surfaces of the above described polarizing plate. Here, such an adhesive material layer may be formed on either surface of the polarizing plate, and for example, may be formed on the surface of the above described optical compensating retardation film that is exposed from the polarizing plate.

In the case where the surface of the adhesive material layer that has been provided to the polarizing plate as described above is exposed, it is preferable to cover the surface with a separator for the purpose of preventing contamination or the like during the time before the above described adhesive material layer is practically used. Such a separator can be formed according to a method wherein an appropriate film, such as the above described transparent protective films, is provided with a release coating of a release agent such as a silicon based agent, a long chain an alkyl based agent, a fluorine based agent or a molybdenum sulfide, if necessary.

The above described adhesive material layer may be formed of a single layer, or may have a layered body. As the layered body, a layered body where single layers having different compositions or single layers of different types, for example, are combined can be utilized. In addition, in the case where the adhesive material layers are placed on the two sides of the above described polarizing plate, they may be the same adhesive material layers, or may be adhesive material layers having different compositions, or adhesive material layers of different types. The thickness of such adhesive material layers is appropriately determined in accordance with the configuration of the polarizing plate, and is generally 1 µm to 500 µm, preferably 5 µm to 200 µm, and more preferably 10 µm to 100 µm.

The adhesive material that forms the above described adhesive material layers preferably exhibits excellent optical transparency, appropriate wettability, and adhesive properties such as cohesion and adhesion. As for concrete examples, adhesive materials that have been prepared using polymers such as acryl based polymers and silicone based polymers, polyester, polyurethane, polyamide, polyether, and polymers such as fluorine based polymers and rubber based polymers as base polymers can be cited.

The adhesive properties of the above described adhesive material layer can be appropriately controlled, for example, according to a conventional method, by adjusting the degree of cross-linking, the molecular weight and the like on the basis of the composition and the molecular weight of the base polymer that is to form the above described adhesive material layer, the method for cross-linking, the contents of the cross-linking functional group, the ratio of the mixture of the cross-linking agent and the like.

As for the polarizing plate, a polarizing plate on which an additional optical layer is layered, for example, can be utilized for practical use. Though such an optical layer is not particularly limited, optical layers which are used for the formation of a liquid crystal display (which corresponds to the above described image display), such as a reflective plate, a transflective reflective plate, a retardation film including λ plates, a ½ wavelength plate, a ¼ wavelength plate and the like, a view angle compensating film and a brightness increasing film can be cited, as shown in the following. In addition, these optical layers may be of one type, or two or more types may be used together. It is preferable for such optical members to be a reflective type polarizing plate, a transflective reflective type polarizing plate, an % elliptic polarizing plate, a circular polarizing plate, a polarizing plate where a view angle compensating film is layered, or the like. These varieties of polarizing plates are described below.

First, an example of a reflective type polarizing plate and transflective reflective polarizing plate of the present invention is described. An additional reflective plate is layered on a polarizing plate as described above after heat treatment in the above described reflective type polarizing plate and an additional transflective reflective plate is layered on a polarizing plate as described above after heat treatment.

The above described reflective type polarizing plate is usually placed on the rear side of a liquid crystal cell, and can be utilized for a liquid crystal display (reflective type liquid crystal display) or the like of a type for the display with incident light from the visible side (display side) being reflected. Such a reflective type polarizing plate has the advantage of making reduction in the thickness of a liquid crystal display possible, because a light source, such as a backlight, does not need to be incorporated, and thus can be omitted.

The above described reflective type polarizing plate can be fabricated according to a conventional method, such as a method for forming a reflective plate of a metal or the like on one side of the above described polarizing plate. Concretely speaking, a reflective type polarizing plate can be cited, wherein a mat process, for example, is carried out on one side (exposed side) of the transparent protective layer in the above described polarizing plate if necessary, and a metal foil or a deposition film is formed of a reflective metal, such as aluminum, on the surface of this side as a reflective plate.

In addition, a reflective type polarizing plate can also be cited, wherein, a reflective plate is formed on a transparent protective layer of which the surface has a microscopic uneven structure that contains microscopic particles in any of a variety transparent resins, as described above, in a manner where the microscopic uneven structure is reflected in the reflective plate. The reflective plate of which the surface has the microscopic uneven structure has the advantage of preventing directivity or glare by, for example, diffusing incident light into irregular reflection, and of suppressing irregular brightness and darkness. Such a reflective plate can be formed directly on an uneven surface of the above described transparent protective layer as a metal foil for a metal deposition film, as described above, according to a conventional method such as a plating method, as well as a deposition method, including a vapor deposition method, an ion plating method and a sputtering method.

In addition, a reflective sheet and the like where a reflective layer is provided on an appropriate film, such as the above described transparent protective film, may be utilized as a reflective plate, in place of the above described reflective plate that is formed directly on the transparent protective layer of the polarizing plate, as described above. The above described reflective layer in the above described reflective plate is usually formed of a metal, and therefore, it is preferable for the reflective surface on the above described reflective layer to be in the condition of being coated with a film, as described above, or a polarizing plate, when being used, in order to prevent reduction in the reflectance due to oxidation, sustain the initial reflectance for a long period of time, and avoid separate formation of a transparent protective layer, for example.

On the other hand, the above described transflective polarizing plate has a transflective reflective plate in place of a reflective plate, as in the above described reflective type polarizing plate. A half mirror that reflects light from a reflective layer, and that transmits light can be cited as an example of the above described transflective reflective plate.

The above described transflective polarizing plate is normally provided on the rear side of a liquid crystal cell so as to be utilized in a type of liquid crystal display or the like, wherein an image is displayed by reflecting incident light from the visible side (display side) in the case where the liquid crystal display is utilized in a comparatively bright atmosphere, and an image is displayed by utilizing the incorporated night source, such as a backlight, that is incorporated on the back side of the transflective polarizing plate in a comparatively dark atmosphere. That is to say, the above described transflective polarizing plate is useful for forming a type of liquid crystal display that allows energy that is utilized for a light source, such as a backlight, to be saved in a bright atmosphere, and that allows the transflective type polarizing plate to be utilized when using the above described incorporated light source in a comparatively dark atmosphere.

Next, an example of an elliptical polarizing plate and circular polarizing plate is described. An additional retardation film or λ plate is layered on a polarizing plate as described above, after heat treatment in the above described polarizing plates.

The above described elliptical polarizing plate can be used effectively in the case where hue (blue or yellow) caused by birefringence of, for example, the liquid crystal layer of a super twist nematic (STN) type liquid crystal display, is compensated for (prevented), so as to gain a black and white display without hue, as described above. Furthermore, an elliptical polarizing plate where the three-dimensional index of refraction is controlled is preferable, because it allows hue caused when the screen of the liquid crystal display is viewed from a diagonal direction to be compensated for (prevented). On the other hand, the above described circular polarizing plate is effective in the case where the color tone of an image, which is displayed in color, of a reflective type liquid crystal display is adjusted and has a function of reflection prevention.

The above described retardation film is used in the cases where linear polarization is converted to elliptical polarization or circular polarization, elliptical polarization or circular polarization is converted to linear polarization, or the direction of polarization of linear polarization is converted. Han particular, a ¼ wavelength plate (also referred to as λ/4 plate), for example, is used as a retardation film that converts linear polarization to elliptical polarization or circular polarization, and that converts elliptical polarization or circular polarization to linear polarization, respectively, and a ½ wavelength plate (also referred to as λ/2 plate) is utilized in the case where the direction of polarization of linear polarization is converted.

As for the materials of the above described retardation films, for example, polyolefins such as polycarbonate, polyvinyl alcohol, polystyrene, polymethyl methacrylate, polypropylene and the like, birefringent film gained by carrying out an expansion process on polymer films such as polyarilate, polyamide, polyimide and polynorbornene, orientation films of liquid crystal polymers, layered bodies where orientation layers of liquid crystal polymers are supported by films and the like can be cited.

As for the types of the above described retardation films, for example, a variety of wavelength plates, such as a λ/2 plates a λ/4 plate and the like, plates having purpose of compensation for hue due to birefringence of liquid crystal layers and compensation of visible angles, such as reduction visible angle expansion, and other plates having retardation in accordance with purposes of utilization may be involved, in addition to inclination orientation films where the index of refraction in the direction of the thickness is controlled. In addition, layered bodies where two or more types of retardation films are layered so that optical properties such as retardation is controlled may be used.

The above described inclination orientation films can be gained according to a method, for example, for applying an expansion process or a contraction process on polymer films under the working effects of this shrinking force due to the application of heat by making heat shrinkable films adhere to these polymer films, or according to a method for diagonally orienting liquid crystal polymers.

Next, an example of a polarizing plate on which a visible angle compensating film has been layered is described. The above described visible angle compensating film is a film of which the visible angle has been expanded in a manner where an image of the liquid crystal display can be viewed comparatively clearly, even in the case where the image is seen from a slightly diagonal direction, instead of the direction perpendicular to the image. As for such a visible angle compensating film, for example, a triacetyl cellulose film to which discotic liquid crystal or nematic liquid crystal is applied, or a retardation film is used. As for a conventional retardation film, for example, a polymer film having birefringence that has been expanded in uniaxial direction of this plane is utilized, and as for the above described visible angle compensating film, for example, a retardation film, such as a two-direction expanded film, including a polymer film having birefringence that has been expanded in biaxial direction in the plane, or an inclination oriented polymer film that has been expanded in an axis direction in the plane has also expanded in the direction of the thickness, and of which the index of refraction in the direction of the thickness is controlled, is utilized. As for the above described inclination orientation film, for example, a polymer film to which a heat shrinking ram is made to adhere, and to which an expansion process or a contraction process is applied under the working effects of the shrinking force due to the application of heat, a liquid crystal polymer which has been diagonally oriented and the like can be cited. Here, as for the material of the above described polymer film, the same type of polymer materials of the above described retardation films, as described above, can be utilized.

Next, an example of a polarizing plate where an additional film for increasing brightness is layered on the above described polarizing plate is described. This polarizing plate is normally utilized by being placed on the rear side of a liquid crystal cell. The above described film for increasing brightness exhibits properties that reflect light resulting from linear polarization in a predetermined polarization axis or circular polarization in a predetermined direction when natural light enters, due to the backlight of the liquid crystal display or due to reflection from the rear side thereof, while allowing other light to transmit. Light from a light source, such as a backlight, is allowed to enter, so as to gain transmitting night in the condition of being polarized in a predetermined manner, while light in the condition other than the above described condition of being polarized in a predetermined manner is reflected without being allowed to transmit. The light that has been reflected from the surface of this film for increasing brightness is inverted via a reflective plate or the like that has been provided on the back side of the film, is made to reenter the film for increasing brightness so that a portion or the entirety of the light is allowed to transmit as light in the condition of being polarized in a predetermined manner, and thereby, an increase in the amount of light that transmits the film for increasing brightness is achieved, and at the same time, polarized light which is difficult to absorb for a polarizing film (polarizer) is supplied so as to achieve an increase in the amount of light that can be utilized for the liquid crystal image display, thus increasing brightness. In the case where light emitted by a backlight or the like enters through a polarizer from the rear side of a liquid crystal cell without utilization of the above described film for increasing brightness, light having a polarization direction that does not agree with the polarization axis of the above described polarizer is mostly absorbed by the above described polarizer, and does not transmit through the above described polarizer. That is to say, approximately 50% of light, the ratio of which may differ, depending on the properties of the utilized polarizer, is absorbed by the above described polarizer, and accordingly, the amount of light that can be utilized for the liquid crystal image display is decreased, leaving the image dark. The above described film for increasing brightness does not allow light having a polarization direction that is absorbed by the polarizer to enter into the above described polarizer, but rather, allows such light to be reflected once from the film for increasing brightness, and in addition, is inverted via the reflective plate that has been provided on the rear side of the film, thus repeating reentrance of night into the above described film for increasing brightness. Therefore, polarized night of which the polarization direction allows the light which is reflected or inverted between the film and the reflective plate to pass through the above described polarizer is transmitted so as to be supplied to the above described polarizer, and therefore, light emitted by the backlight can be efficiently utilized for the display of an image of a liquid crystal display, and the image can be made bright.

The types of the above described film for increasing brightness are not particularly limited, but rather, for example, a film that exhibits properties for allowing night resulting from linear polarization in a predetermined polarization axis to transmit while reflecting other light, such as a multilayered thin film of dielectrics, a multilayered body of thin films having different anisotropies of the index of refraction can be utilized. En addition, a film that exhibits properties for reflecting light resulting from a pair of circular polarization in right and left direction while allowing other light to transmit, such as a cholesteric liquid crystal layer, in particular, an orientation film of cholesteric liquid crystal polymers, and an orientation liquid crystal layer supported on a film base may be utilized.

Accordingly, a film for increasing brightness of a type for transmitting light resulting from linear polarization of a predetermined polarization axis can efficiently transmit light while suppressing absorption loss by the above described polarizing plate, by allowing the transmission light thereof to enter the polarizing plate when having the same polarization axis. On the other hand, in the case of a film for increasing brightness of a type for transmitting light resulting from circular polarization, such as a cholesteric liquid crystal layer, though the transmission light may be allowed to enter the polarizer without change, it is preferable for the transmitted light resulting from circular polarization to be linearly polarized via a retardation film before entering the above described polarizer, from the point of view of suppression of absorption loss. Here, a ¼ wavelength plate is used as the above described retardation film, and thereby, circular polarization can be converted to linear polarization.

In many cases, the above described film for increasing brightness exists on the top surface on the backlight side, and therefore, scratches and unevenness may easily be caused at the time of handling or at the time of attachment to the panel, and therefore, it is also possible to carry out a process such as a hard coating process on the top surface of the above described farm for increasing brightness, in order to prevent such scratches and unevenness. The above described hard coating process is, for example, a process for forming a hard coating film having a high degree of hardness and smoothness of a hard resin on the surface of the above described film for increasing brightness. As for the above described hard resin, for example, ultraviolet curing resins, such as silicon based resins, urethane based resins, acryl based resins and epoxy based resins can be utilized, and the above described process can be carried out according to a conventional method.

Furthermore, the above described film for increasing brightness, in general, is easily charged with static electricity, and therefore, there is a possibility that the orientation of the liquid crystal of the liquid crystal display will be disturbed, thus negatively affecting the display. For the purpose of preventing this, a static electricity prevention function may be added to the above described film for increasing brightness. As for the materials for implementing the above described static electricity prevention function, a static electricity prevention agent such as cationic materials, anionic materials and non-ionic materials, conductive polymers such as polyolefin based polymers and polyaniline polymers, and microscopic particles having conductivity such as alumina, titania, zirconia, tin oxide, indium oxide and antimony oxide can be cited, without particular limitations.

A retardation film that functions as a ¼ wavelength plate in a wide wavelength range, such as the visible light range, is gained by, for example, layering a retardation layer that functions as a ¼ wavelength plate for single color light, such as light having a wavelength of 550 nm, and a retardation layer showing the retardation properties (for example, retardation layer that functions as a ½ wavelength plate). Accordingly, a retardation film that is placed between the polarizing plate and the film for increasing brightness may be a layered body formed of one or more retardation layers. Here, a cholesteric liquid crystal layer can have a layered structure where two or more layers having different reflected wavelengths are combined and layered. As a result of this, a polarizing plate for reflecting light resulting from circular polarization in a wide wavelength range, such as the visible light range, can be gained, and transmission circular polarization in a wide wavelength range can be gained, based on this.

A variety of polarizing plates, as described above, may, for example, be polarizing plates on which two or more optical layers are layered. Concretely speaking, a reflective type elliptical polarizing plate, a transflective elliptical polarizing plate and the like, which are gained by combining reflective type polarizing plates or transflective polarizing plates, as described above, and retardation films can be cited.

As described above, though a polarizing plate on which two or more optical layers have been layered can be formed according to a method for layering sequentially and separately during the manufacturing process for a liquid crystal display or the like, the polarizing plate that has been formed in advance as a combination of layered bodies has the advantage where the stability in the product quality and working efficiency in assembly are excellent for increasing the manufacturing efficiency for a liquid crystal display or the like. Here, a variety of adhesion means, such as an adhesive material layer, can be used in the layers, as described above.

In addition, respective layers, such as polarizing films that form a variety of polarizing plates wherein the above described polarizing plate and optical layers are layered, transparent protective layers, optical layers and adhesive layers may be provided with the ability to absorb ultraviolet rays by appropriately processing these with an ultraviolet absorbing agent, such as, for example, a salicylate based compound, a benzophenone based compound, a benzotriazole based compound, a cyanoacrylate based compound or a nickel complex based compound.

It is preferable for a polarizing plate to be utilized in any of a variety of forms, such as in a liquid crystal display, as described above, and the polarizing plate can be, for example, used in a liquid crystal display of a reflective type, a transflective type, or a type that is both transmittable and reflective, where the polarizing plate is placed on one or two sides of the liquid crystal cell. The type of the above described liquid crystal cell for forming the liquid crystal display can be arbitrarily selected, and, for example, a thin film transistor type, a single matrix driving type, represented by a super twist nematic type, and various other types of liquid crystal cells can be utilized.

In addition, in the case where a variety of polarizing plates on which a polarizing plate and an optical layer are layered are provided to the screen of a liquid crystal cell, they may be of the same type, or may be different types. Furthermore, at the time of the formation of a liquid crystal display, one or more layers of appropriate parts, such as prism array sheets, lens array sheets, light diffusing plates, backlights and the like can be placed at appropriate positions.

A liquid crystal display where a polarizing plate that has been cut, as described above, is placed on at least one surface of a liquid crystal cell becomes an apparatus having excellent display quality when mounted on a panel, for example, in a small frame mode.

Other Embodiments (1) In the present invention, it is good if the rotation axis S of the cutting member 5 extends along the vertical direction of the end face 10, and is not limited to a direction that is parallel to the vertical direction. For example, as shown in FIG. 7, the rotation axis S may be tilted to the longitudinal direction W of the end face 10 and the cutting blade 7 may enter the end face 10 from one direction. Consequently, contact by the return rotation of the cutting blade 7 to the end face 10 is prevented, and the cutting traces are formed extending to a fixed direction. As a result, the cutting trace becomes less conspicuous on the end face of the sheet member, and good appearance quality can be obtained. En such a case, it is good if the rotation axis S is tilted at the level that the cutting blade 7 does not contact the end face 10 on one side of the longitudinal direction, and its angle is not especially limited.

(2) In the present invention, as shown in FIG. 8, the cutting may be performed in the state that the rotation axis a of the cutting member 5 is tilted to the direction of the thickness of the end face 10 (the up and down direction in FIG. 8). Consequently, the cutting can be performed by tilting the end face of the sheet member to the direction of the thickness and can accommodate many varieties. There is a case such that sheet members are used to form a large-sized sheet member by placing end faces with each other, and light leaks can be prevented effectively at the interface of the end faces placed face to face because the irregularity of the end face is suppressed, and it can be finished in good condition according to the present invention. An example of the tilting angle of the rotation axis S is 60°, and it can be set properly depending on the desired shape of the end face.

(3) In the above-described embodiments, examples of cutting one side of the end face of the sheet member are shown. However, the same cutting can be performed on the other side of the end face. In such a case, a plurality of the end faces of the sheet member can be cut at the same time using a plurality of the cutting members at the same time.

(4) The device to be used in the method for cutting in the present invention is not limited to those shown in the above-described embodiments, and a fixing method of the sheet member and the shaped of the cutting member may have other states. Further, the shape of the sheet member is not especially limited, and the device can be applied for the cutting of the sheet member of various shapes other than a rectangle such as a hexagon and an octagon.

EXAMPLES

In order to show the configuration and the effect of the present invention specifically, the cutting was actually performed on the end face of a sheet member, the condition of the surface of its end face was studied, and these are explained. A polarizing plate (Polarizing Plate SEG1224, manufactured by Nitto Denko Corp.) to be mounted in a liquid crystal display device was used as a sheet member. The polarizing plate was provided with transparent protective layers (TAC) on both sides of a polarizer (a polarizing film) through an adhesive layer, as well as a protective film to prevent scratches and dirt on the surface of one of the transparent protective layers through an agglutinant layer; an agglutinant layer is formed to adhere the polarizing plate to the liquid crystal display device on the surface of the other transparent protective layer, and its surface is provided with a separator to protect the agglutinant layer.

After the cutting, the maximum height of the end face of the cut sheet member was measured using a 3D shape automated measuring unit VHX-S15, a digital microscope VHX-200, and a high magnification zoom lens VH-Z450 (all of these are manufactured by Keyence Corp.). In detail, the end face of the cut sheet member was observed at the lens magnification ×450 with the zoom lens, the irregular shape measured along the longitudinal direction of the TAC part with the 3D shape automated measuring unit was displayed on the microscope, and the maximum height (the maximum value of difference in level due to unevenness) was calculated. The result of the measurement was treated as an average value of the maximum values each calculated on both TACs.

Example 1

Based on the above-described embodiments, six of the above-descried polarizing plates (320 μm/plate) were laminated, the thickness was made to be about 1.9 mm, and the cutting was performed on its end face with a cutting margin of 0.5 mm. The radius of the cutting region was 72.5 mm. The rotation axis of the cutting member was parallel to the vertical direction of the end face. Further, the cutting was performed with the bottom face of the acrylic plates sandwiching the layered sheet members laying on the same line of the lower end of the cutting region (outer peripheral edge), with the process conditions that the rotation speed of the cutting member was 4500 rpm and the movement velocity was 2.0 m/min. The thickness of the acrylic plate was 3 mm and the top face of the layered sheet members was made to pass at 4.9 mm high from the lower end of the cutting region. Therefore, in Example 1, the cutting region contacting the end face of the sheet member becomes a part separated by $13/14$ of the radius or more which corresponds to the part being separated by $10/11$ of the radius or more from the virtual line parallel to the sheet face and passing the center of the rotation, and the angle at which the cutting blade entered the top face of the six layered sheet members becomes 21°. Furthermore, the above-described maximum height was measured for each sheet member up to the $6^{th}$ sheet with the $1^{st}$ sheet to be the side of the rotation axis of the cutting member, and the largest value among the maximum heights was treated as a worst value.

Example 2

Example 2 was performed in the same manner as Example 1 except the cutting was performed as the top face of the layered sheet members was made to pass at 6 mm high from the lower end of the cutting region. Therefore, in Example 2, the cutting region contacting the end face of the sheet member becomes a part separated by $11/12$ of the radius or more from the virtual line, and the angle at which the cutting blade entered the top face of the six layered sheet members becomes 23°.

Example 3

Example 3 was performed in the same manner as Example 1 except the cutting was performed as the top face of the layered sheet members was made to pass at 7 mm high from the lower end of the cutting region. Therefore, in Example 3, the cutting region contacting the end face of the sheet member becomes a part separated by $9/10$ of the radius or more from the virtual line, and the angle at which the cutting blade entered the top face of the 6 layered sheet members becomes 25°.

Example 4

Example 4 was performed in the same manner as Example 1 except the cutting was performed as the top face of the layered sheet members was made to pass at 12 mm high from the lower end of the cutting region. Therefore, in Example 4, the cutting region contacting the end face of the sheet member becomes a part separated by $5/6$ or more and $10/11$ or less of the radius from the virtual line, and the angle at which the cutting blade entered the top face of the six layered sheet members becomes 33°.

Example 5

Example 5 was performed in the same manner as Example 1 except the cutting was performed as the top face of the layered sheet members was made to pass at 24 mm high from the lower end of the cutting region. Therefore, in Example 5, the cutting region contacting the end face of the sheet member becomes a part separated by $2/3$ of the radius or more from the virtual line, and the angle at which the cutting blade entered the top face of the 6 layered sheet members becomes 48°.

Example 6

Example 6 was performed in the same manner as Example 1 except the cutting was performed as the top face of the layered sheet members was made to pass at 36 mm high from the lower end of the cutting region. Therefore, in Example 6, the cutting region contacting the end face of the sheet member becomes a part separated by ½ of the radius or more from the virtual line, and the angle at which the cutting blade entered the top face of the six layered sheet members becomes 59°.

Example 7

Example 7 was performed in the same manner as Example 1 except the cutting was performed as the top face of the layered sheet members was made to pass at 48 mm high from the lower end of the cutting region. Therefore, in Example 7, the cutting region contacting the end face of the sheet member becomes a part separated by ⅓ of the radius or more from the virtual line, and the angle at which the cutting blade entered the top face of the six layered sheet members becomes 70°.

Example 8

Example 8 was performed in the same manner as Example 1 except the cutting was performed as the top face of the layered sheet members was made to pass at 52 mm high from the lower end of the cutting region. Therefore, in Example 8, the cutting region contacting the end face of the sheet member becomes a part separated by ¼ of the radius or more from the virtual line, and the angle at which the cutting blade entered the top face of the six layered sheet members becomes 73°.

Comparative Example

Comparative Example was performed in the same manner as Example 1 except the cutting was performed as the center of the layered sheet members passed the rotation center of the cutting region.

Example 9

As shown in FIG. 8, Example 9 was performed in the same manner as Example 1 except the cutting was performed in the state that the rotation axis of the cutting member was tilted at 30° to the direction of the thickness of the end face.

Example 10

Example 10 was performed in the same manner as Example 1 except the cutting was performed using one of the above-described polarizing plates (320 μm/plate) as its top was made to pass at 3.3 mm high from the lower end of the cutting region. Therefore, in Example 10, the cutting region contacting the end face of the sheet member becomes a part separated by 20/21 of the radius or more from the virtual line, and the angle at which the cutting blade entered the top face of the six layered sheet members becomes 17°.

Example 11

Example 11 was performed in the same manner as Example 1 except the cutting was performed in a state that the movement velocity of the cutting member was 1.0 m/min.

Example 12

Example 12 was performed in the same manner as Example 1 except the cutting was performed in a state that the movement velocity of the cutting member was 3.5 m/min.

Example 13

Example 13 was performed in the same manner as Example 1 except the cutting was performed in a state that the rotation speed of the cutting member was 2500 rpm.

Example 14

Example 14 was performed in the same manner as Example 1 except the cutting was performed in a state that the rotation speed of the cutting member was 6500 rpm. The evaluation result of each Example and Comparative Example is shown in Table 1 and Table 2.

TABLE 1

| | | Example 1 | Example 2 | Example 3 | Example 4 | Example 5 | Example 6 | Example 7 | Example 8 |
|---|---|---|---|---|---|---|---|---|---|
| NUMBER OF SHEETS LAMINATED | | 6 | 6 | 6 | 6 | 6 | 6 | 6 | 6 |
| POSITION OF CUTTING | | 4.9 mm INSIDE | 6 mm INSIDE | 7 mm INSIDE | 12 mm INSIDE | 24 mm INSIDE | 36 mm INSIDE | 48 mm INSIDE | 52 mm INSIDE |
| DISTANCE FROM VIRTUAL LINE | | 13/14 OR MORE OF THE RADIUS | 11/12 OR MORE OF THE RADIUS | 9/10 OR MORE OF THE RADIUS | 5/6 OR MORE OF THE RADIUS | 2/3 OR MORE OF THE RADIUS | 1/2 OR MORE OF THE RADIUS | 1/3 OR MORE OF THE RADIUS | 1/4 OR MORE OF THE RADIUS |
| ENTERING ANGLE (°) | | 21 | 23 | 25 | 33 | 48 | 59 | 70 | 73 |
| ROTATION SPEED (rpm) | | 4500 | 4500 | 4500 | 4500 | 4500 | 4500 | 4500 | 4500 |
| MOVEMENT VELOCITY (m/min) | | 2.0 | 2.0 | 2.0 | 2.0 | 2.0 | 2.0 | 2.0 | 2.0 |
| ANGLE OF END FACE (°) | | 0 | 0 | 0 | 0 | 0 | 0 | 0 | 0 |
| MAXIMUM HEIGHT (μm) | WORST VALUE | 5.3 | 5.1 | 4.0 | 3.6 | 4.8 | 4.9 | 5.6 | 5.8 |
| | 1st SHEET | 4.7 | 4.2 | 3.5 | 3.5 | 4.7 | 4.5 | 5.5 | 5.8 |
| | 2nd SHEET | 4.5 | 4.6 | 3.6 | 3.6 | 4.8 | 4.9 | 5.6 | 5.4 |
| | 3rd SHEET | 4.7 | 4.8 | 3.8 | 3.4 | 4.5 | 4.3 | 5.0 | 5.7 |
| | 4th SHEET | 5.3 | 4.8 | 3.6 | 3.1 | 4.5 | 3.9 | 5.5 | 5.4 |
| | 5th SHEET | 5.0 | 5.1 | 4.0 | 3.4 | 3.7 | 4.3 | 5.0 | 5.2 |
| | 6th SHEET | 5.3 | 4.8 | 4.0 | 3.1 | 4.3 | 3.3 | 5.0 | 5.0 |

TABLE 2

|  |  | Comparative Example | Example 9 | Example 10 | Example 11 | Example 12 | Example 13 | Example 14 |
|---|---|---|---|---|---|---|---|---|
| NUMBER OF SHEETS LAMINATED | | 6 | 6 | 1 | 6 | 6 | 6 | 6 |
| POSITION OF CUTTING | | CENTER | 4.9 mm INSIDE | 3.3 mm INSIDE | 4.9 mm INSIDE | 4.9 mm INSIDE | 4.9 mm INSIDE | 4.9 mm INSIDE |
| DISTANCE FROM VIRTUAL LINE | | 0 | 13/14 OR MORE OF THE RADIUS | 20/21 OR MORE OF THE RADIUS | 13/14 OR MORE OF THE RADIUS | 13/14 OR MORE OF THE RADIUS | 13/14 OR MORE OF THE RADIUS | 13/14 OR MORE OF THE RADIUS |
| ENTERING ANGLE (°) | | 90 | 21 | 17 | 21 | 21 | 21 | 21 |
| ROTATION SPEED (rpm) | | 4500 | 4500 | 4500 | 4500 | 4500 | 2500 | 6500 |
| MOVEMENT VELOCITY (m/min) | | 2.0 | 2.0 | 2.0 | 1.0 | 3.5 | 2.0 | 2.0 |
| ANGLE OF END FACE (°) | | 0 | 30 | 0 | 0 | 0 | 0 | 0 |
| MAXIMUM HEIGHT (μm) | WORST VALUE | 6.3 | 5.6 | 5.7 | 5.8 | 5.5 | 5.2 | 5.2 |
| | 1st SHEET | 4.8 | 5.5 | 5.7 | 4.5 | 3.7 | 4.6 | 3.9 |
| | 2nd SHEET | 5.9 | 5.6 | — | 4.6 | 4.8 | 4.8 | 3.8 |
| | 3rd SHEET | 6.0 | 5.2 | — | 5.1 | 4.7 | 4.8 | 4.8 |
| | 4th SHEET | 6.3 | 5.4 | — | 5.5 | 4.8 | 5.2 | 5.0 |
| | 5th SHEET | 6.2 | 5.2 | — | 5.4 | 5.2 | 5.1 | 5.2 |
| | 6th SHEET | 5.6 | 5.2 | — | 5.8 | 5.5 | 5.2 | 5.2 |

As shown in Tables 1 and 2, any of the maximum heights of each Example is smaller than that of Comparative Example, and the state of the end face could be made to be good by making the region separated from the virtual line parallel to the sheet face and passing the rotation center in the cutting region contact the end face. Especially in Examples 1 to 79 the state of the cut end face is smooth and the maximum height becomes small effectively, and because it is obvious in Examples 3 to 6 among these Examples, it is discovered that a part separated by ⅓ of the radius or more from the virtual line in the cutting region is made to preferably contact the end face, and more preferably a part separated by ½ or more. Moreover, the maximum height of a few sheets on the side of the rotation axis in Example 3 and that in Example 4 is the smallest, and it is discovered that it is preferable that a part separated by ⅚ or more and 10/11 or less of the radius from the virtual line in the cutting region is made to contact the end face. Further, from the result in Example 10, it is discovered that even one polarizing plate can be cut without a problem. However, it is discovered that the cutting is preferably performed in the state that a plurality of sheets are laminated.

Here, each of FIGS. 11 to 23 is a photo showing the end face after the cutting in the present invention. FIG. 11 is a microscope photo showing a front view of its end face, and it is found that the end face is finished in a good condition without cracks and gaps. FIG. 12 is a microscope photo showing a side view when the end faces are placed face to face and it is found that the unevenness of the end face is suppressed and machined smoothly. FIG. 13 shows a laminated body of the polarizing plate, and it is confirmed that reflection of the light occurs because the end face is smooth and is finished in shiny condition.

On the other hand, each of FIGS. 14 to 16 is a photo showing the end face after the cutting in the conventional method and corresponds to FIGS. 11 to 13. In FIG. 14, it is found that cracks and gaps are confirmed between the polarizer and TAC and the end face is rough. This is considered because the cutting blade operated in the direction in which the end face of the sheet member is pressed straight down (or pressed straight up). Further, as shown in FIG. 15, a comparatively large unevenness is formed on the end face, and in FIG. 16, a diffused reflection of the light occurs and the end face is in the state of a non-shiny finish.

What is claimed is:

1. A cutting method for cutting the end face of a sheet member, wherein
   while rotating a cutting member having a rotation axis extending along the vertical direction of the end face of the sheet member and a cutting blade projecting to the side of the end face of the sheet member around the rotation axis, the cutting member is moved relatively to the sheet member along the longitudinal direction of the end face to be cut, and
   the part separated from a virtual line parallel to the sheet face and passing the rotation center in the cutting region formed by the rotating cutting blade is made to contact the end face of the sheet member, wherein
   the rotation axis of the cutting member is tilted in the longitudinal direction of the end face of the sheet member, and the rotating cutting blade enters the end face of the sheet member from only one direction, and
   the sheet member is an optical film.

2. The cutting method as in claim 1, wherein the angle at which the cutting blade enters the end face is 75° or less to the longitudinal direction of the end face when the part of the cutting region contacts with the end face of the sheet member.

3. The cutting method as in claim 1, wherein the part of the cutting region contacting with the end face of the sheet member is separated by ⅓ or more of the radius of a circular shape or a ring shape of the cutting region from the virtual line.

4. The cutting method as in claim 1, wherein a plurality of sheet members is set in the layered state and the end faces of the layered sheet members are cut together.

5. The cutting method as in claim 1, wherein the end face of the sheet member is cut in the state which the rotation axis of the cutting member is tilted in the direction of the thickness of the end face of the sheet member.

6. The cutting method as in claim 1, wherein the sheet member is made by lamination of a plurality of optical films.

7. The cutting method as in claim 1, wherein the rotation speed of the cutting member is 2000 to 7000 rpm and the relative movement velocity of the cutting member is 0.5 to 4.0 m/min.

* * * * *